Dec. 24, 1963    R. D. COREY    3,115,302
HEATING METHOD, MEANS AND CONTROL
Filed Aug. 3, 1959    4 Sheets-Sheet 1

INVENTOR.
RONALD D. COREY
BY Walter C. Wheeler
ATTORNEY

Dec. 24, 1963  R. D. COREY  3,115,302
HEATING METHOD, MEANS AND CONTROL
Filed Aug. 3, 1959  4 Sheets-Sheet 2

INVENTOR.
RONALD D. COREY
BY Walter C. Wheeler
ATTORNEY

Dec. 24, 1963 R. D. COREY 3,115,302
HEATING METHOD, MEANS AND CONTROL
Filed Aug. 3, 1959 4 Sheets-Sheet 3

*INVENTOR.*
RONALD D. COREY
BY Walter C. Wheeler
ATTORNEY

Dec. 24, 1963 R. D. COREY 3,115,302
HEATING METHOD, MEANS AND CONTROL
Filed Aug. 3, 1959 4 Sheets-Sheet 4

INVENTOR.
RONALD D. COREY
BY Walter C. Wheeler
ATTORNEY

United States Patent Office 3,115,302
Patented Dec. 24, 1963

3,115,302
HEATING METHOD, MEANS AND CONTROL
Ronald D. Corey, R.D. 1, Cortland, N.Y.
Filed Aug. 3, 1959, Ser. No. 831,327
26 Claims. (Cl. 237—2)

This invention relates to novel heating systems of the kind which may be used for heating living quarters, to control devices for regulating and operating the same, and especially to heating systems wherein the combustion takes place in a walled combustion chamber which is operated to be heated by combustion therein periodically and only when a predetermined, constant and controlled pressure below that of the surrounding atmosphere is established therein in response to thermostatic calls for heat in the space or room to be heated. In such a heating system the combustion chamber and an extension thereof are located within the room to be heated, and the walls of both are heated to temperatures which emit or radiate infra red.

Heretofore the most common forms of heating systems are those in which radiators are heated by steam or hot water which is generated at some distant point and conducted therefrom to the radiators which are located in the space to be heated, or by hot air systems in which heated air is transported from a distant point outside of the space to be heated and then used to heat the room to be heated by convection. In all such systems relatively large amounts of heat are lost in the stack, and infra red generated in the combustion chamber is not utilized directly in the space to be heated. The utilization of heat exclusively from sources within the infra red zone has been confined to heating high temperature ovens, such as bake ovens which are operated far above temperatures that are tolerable or useable in living room spaces. Only the upper infra red range is utilized as the source of heat in such heaters. They employ a relatively short emitting element which is intensely heated and which has a relatively small area as compared to the total heat input. Accordingly the exhaust gases are passed to the stack at relatively high temperatures which are still heated to temperatures which are within the infra red zone, and the over all heat efficiency is remarkably low. In such a system a combustible air-gas mixture may be burned in a burner which projects the flame into a conduit which is in the form of a closed loop. The flame is projected into the conduit with sufficient force to carry the combustion gases around the loop. At the end of the loop a part of the gas which is equivalent in volume to the combustion gas generated at the burner is led to the stack and rejected, and another part is injected into the burner, reheated and recirculated. The overall heat efficiency is low.

In another direct heating system adapted for lower temperature heating, only a very little, if practically any heat in the infra red range is utilized directly as the source of heat. In this lower temperature system the combustion gas passes through a horizontal tortuous passage or flue, and then to a vertical flue which is equivalent to the well known furnace stack. Other burners may be arranged to discharge heated gas into the tortuous passage. In the latter case the gas discharged from a previous burner may be heated and circulated. The combustion chamber is located in a branch pipe which leads to the conduit and operates at about the pressure of the surrounding atmosphere, heat losses are relatively large at the stack and the use of temperatures hardly within the infra red range are permissible because of fire hazard. It follows that those systems which utilize only the higher infra red range, as well as those which operate scarcely within the lowest range of this zone are either completely unsuitable for use in spaces to be moderately heated, or they leave much to be desired.

The objects of the present invention are attained by providing a control means for supplying a combustible mixture of oxygenous gas and an exothermic combustible material to a burner and thence to a combustion chamber which are operated periodically at a predetermined constant and controlled subatmospheric pressure. The objects are also attained in part by providing various other means for moderating the infra red in certain parts of the heat emitting element and for increasing and lengthening the area of infra red heat emission in other parts of the element. In general a plurality of burners connected in series with each other, together with accompanying combustion chambers and extensions thereof constitutes an infra red emitting unit. Each burner is controlled by a control device, and each is connected to a combustion chamber located within the space to be heated. The combustion chamber is heated to temperatures that emit infra red, and the combustible mixture is burned within the combustion chamber at predetermined constant and controlled pressures lower than that of the surrounding atmosphere. The means which emit infra red also comprises a tubular extension or conduit, connected to the combustion chamber which is located within the space to be heated. The walls of the conduit are heated to infra red temperatures, and become cooled at the discharge end to about the lower limit of temperature where infra red is emitted, namely about 200 degrees Fahrenheit.

In all but the last combustion unit, this extension of the combustion chamber, or conduit conducts the discharged gases to a succeeding burner and combustion chamber. All the combustion gases are thus enabled to pass through all the succeeding combustion chambers in each series of units, except the first unit. The gases are reheated in the combustion chambers and thus serve as one of the means to moderate the temperature in and near each combustion chamber. The increased volume of reheated gas also serves to lengthen and spread out the area heated to infra red temperatures. The rarefication of the gases in the system causes them to move therethrough at high velocity during combustion and this aids in moderating, equalizing and spreading out the infra red area. Still another means which operates to spread out the infra red area is a housing located over the parts which emit infra red and which entraps relatively still air therein and operates as an insulator around the heated parts. The housing is open at the bottom. Transmission of sensible heat to the surrounding air is thereby diminished whilst infra red is emitted undiminished through the open bottom of the housing. In such manner the heated gases within the conduits is caused to carry the heat along, thereby transporting much heat from the hottest parts toward the cooler ends of the conduits. In this manner the hottest of the infra red area is moderated so that an otherwise intensely heated area becomes only moderately heated and useable in moderately heated rooms. The temperature of the cooler end of each conduit is raised, thereby tending to extend the area and length of the infra red heated area, and to distribute the heat more uniformly. The heat in the gases leaving the last infra red area may be led through heat interchangers which may be used to heat the room space or to heat the gases utilized for combustion. High heat efficiencies are attained since only a small proportion of the heat is lost to the stack in such a series system. The exhaust pump or fan used for attaining the subatmospheric pressures in the system is desirably located at the end of each series of burners. For moderating and distributing the heat in the first of a series of the infra red units, air or some of the gas discharged from the exhaust means may be used.

It is among the objects of the present invention to provide a direct heating system which utilizes an entire infra red area, directly heated, as the source of heat.

Another object is to moderate and enlarge the heated area of a conduit which is highly heated at one end so that the heating effect will be less intense at the high temperature end of the heated source, and so that the entire infra red heat emitting area will be enlarged and lengthened.

Another object of the invention is to provide a heating system in which combustion gases are circulated through tubular heat transmitting means located in the space to be heated and to provide for circulating the gases at great velocities.

Still another object is to provide means for controlling the kind of heating system hereinabove indicated.

A further object of the invention is to provide a heating system in which the combustion chamber and the conduits leading therefrom are operated at pressures below that of the surrounding atmosphere.

Other objects of the invention will be apparent from the following description of an embodiment thereof which is made with reference to the drawings in which—

Figure 12:
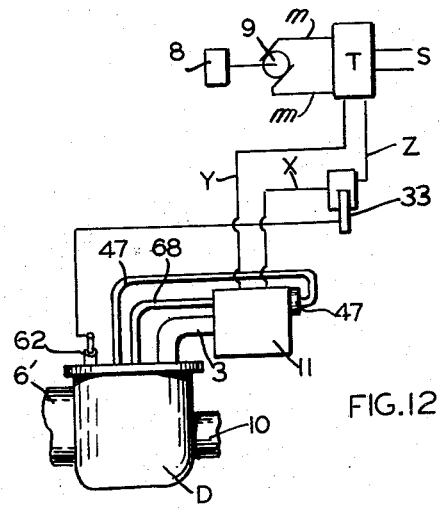
FIG. 12 is a side elevational view of a control device, a burner, a walled combustion chamber, an exhaust gas conductor and a space thermostat, together with certain gas and electrical connections.
Figure 15:
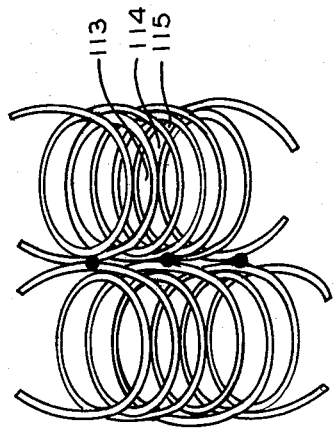
FIG. 15 is a fragmentary front elevational view of a novel burner grid, illustrating the construction thereof.

Control devices in accordance with the present invention are especially constructed and are used for controlling the combustion and heating effects in heating systems wherein a combustible gas mixture passes to a burner D (FIG. 12) and the combustion takes place in a walled combustion chamber 6' which becomes operative only when a predetermined constant and controlled sub-atmospheric pressure is instituted. The reduction of pressure takes place only in response to a thermostatic call for heat in the space or room which is heated, as does also the combustion. In the present system the combustion chamber and the conduit 10 for conducting the products of combustion from the combustion chamber and the system are connected directly or indirectly with a means 8, such as a vacuum pump or fan for creating pressure in the system which is below that of the surrounding atmosphere during combustion. After combustion is instituted the exhaust means 8 is arranged to rid the system of the products of combustion as fast as they are formed, so that the reduced pressure will remain constant at least during the combustion period. When the space to be heated reaches a predetermined high temperature the exhaust means and fuel supply are discontinued in response to thermostatic means located in the room or space which is heated. The combustion chamber 6' and extension 10 are both located in the space to be heated. Thus disposed, the heat is largely derived from the heated walls of the combustion chamber 6' which is heated to temperatures which emanate infra red rays, and from that part of pipe 10 which is heated to such temperatures.

Figure 13:
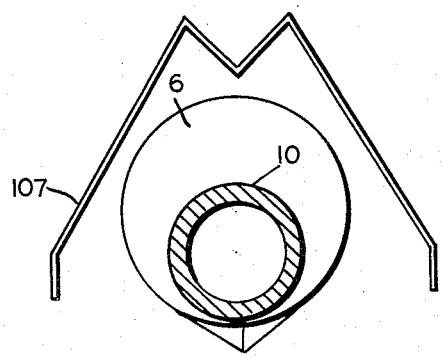
FIG. 13 is an end elevational view of a radiant heat housing and reflector.
Figure 14:
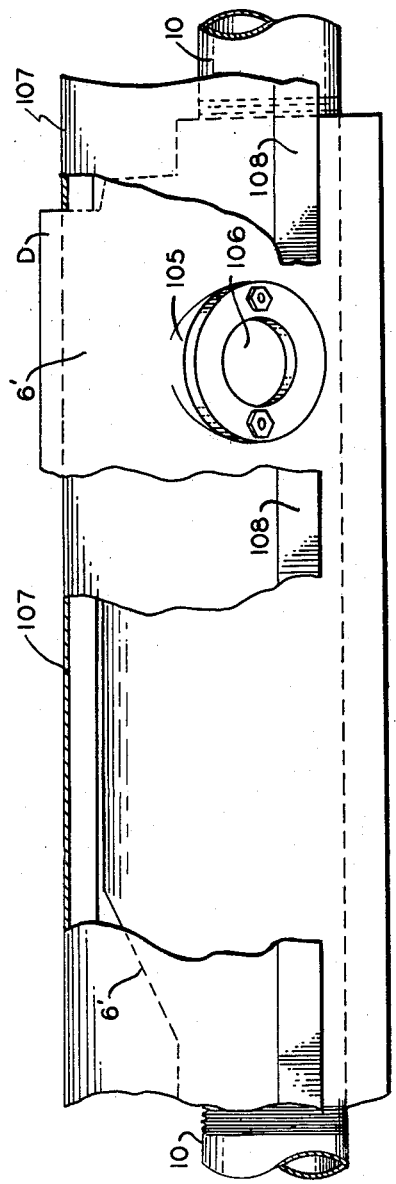
FIG. 14 is a view in perspective with parts broken away of a housing similar to that shown in FIG. 13 assembled with the radiant heaters and burners.
Figure 16:
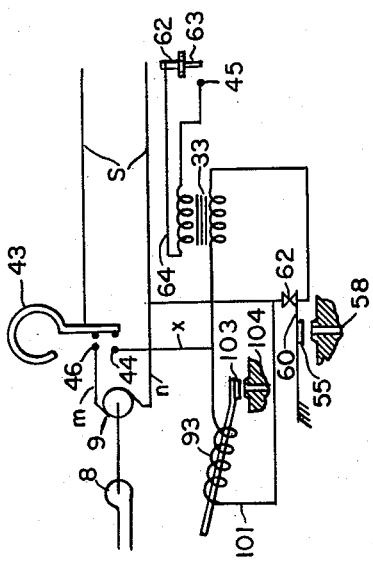
FIGURE 16 is an amplification of the diagrammatic representation of the electrical circuit shown in FIGURE 11.

In heating a room the wall of the combustion chamber is desirably heated to a maximum temperature not exceeding about 800 degrees Fahrenheit and the temperature of the pipe 10 varies from a maximum where it is attached to the combustion chamber to the far end where the temperature approaches about 200 degrees Fahrenheit. About 200 degrees Fahrenheit to about 800 degrees Fahrenheit is regarded herein as the infra red area or range of temperature. Throughout the area where the infra red is emitted a housing 107 (FIGS. 13 and 14) is positioned in close proximity to the top of the combustion chamber and pipe 10. The housing is shaped so as to pocket the air around these parts, eliminate transverse air currents and establish a dead air space which acts as an insulator of sensible heat, a means to prevent convection of heated air and a means to lengthen the area of pipe 10 which is heated to infra red with a given heat input in the combustion chamber. The housing 107 is desirably closed at the ends and open at the bottom and is desirably provided on the inside with a reflective surface for reflecting upwardly directed infra red rays downwardly through the opening in the housing. The reflector may be shaped so that the infra red rays will be directed toward a selected area. The insulation afforded by the housing is effective in lengthening the effective infra red area.

Figure 10:
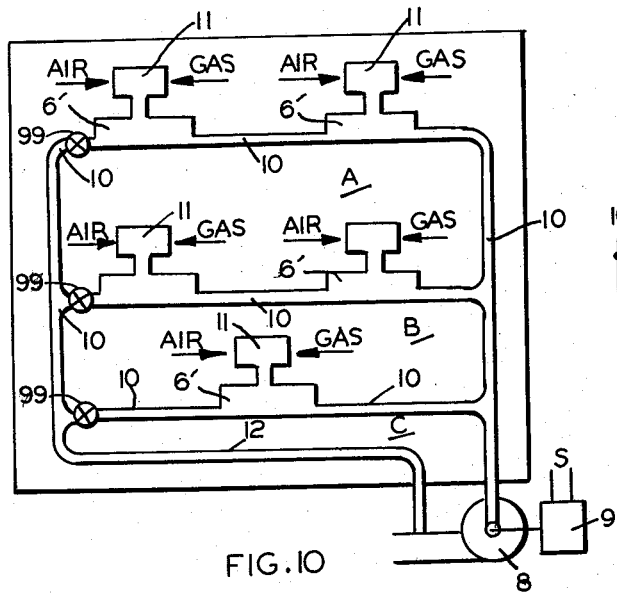
FIG. 10 is a diagrammatic representation illustrating variously arranged heating systems in which the devices of the present invention may be used.

Referring to FIG. 10, in a unit system the conduit 10 may be in the form of a straight or a coiled pipe but for most purposes a straight smooth pipe suffices as an infra red radiator. The pipe 10 is heated mainly by the hot gases which it conducts away from the combustion chamber 6'. The heat generated in the combustion chamber is intense and inert or noncombustible gas, such as the exhaust gas from another burner, air or other noncombustible gas is passed into the combustion chamber to transport heat rapidly into and along the pipe 10 for increasing the area which is heated to infra red. The exhaust gas from another burner is preferred, but any other source of inert or noncombustible gas may be used.

In using the exhaust gas from a preceding burner, heat is kept in the system which would be lost if it were discharged to the stack. In the first burner of a series the exhaust gas from the exhaust pump may desirably be used instead of air or a noncombustible gas from another source. The admission of air or exhaust gas to a single combustion chamber, or to the first combustion chamber of a series of burners is controlled by a valve or damper 99 which can be closed, or opened more or less according to the amount of gas to be admitted through pipe 12 for modifying the heat level of the infra red area to the desired extent. It is evident that a three way valve adjustable for admitting exhaust gas through pipe 12, or for admitting air or for closing pipe 12 can be used when such an alternative is desirable.

The low pressures maintained in the system during combustion results in high velocity gas circulation from the combustion chamber through pipe 10. This aids in moderating the heat in and near the combustion chamber while increasing the temperature in the cooler parts of the conduit 10.

The Control Device

Figure 1:
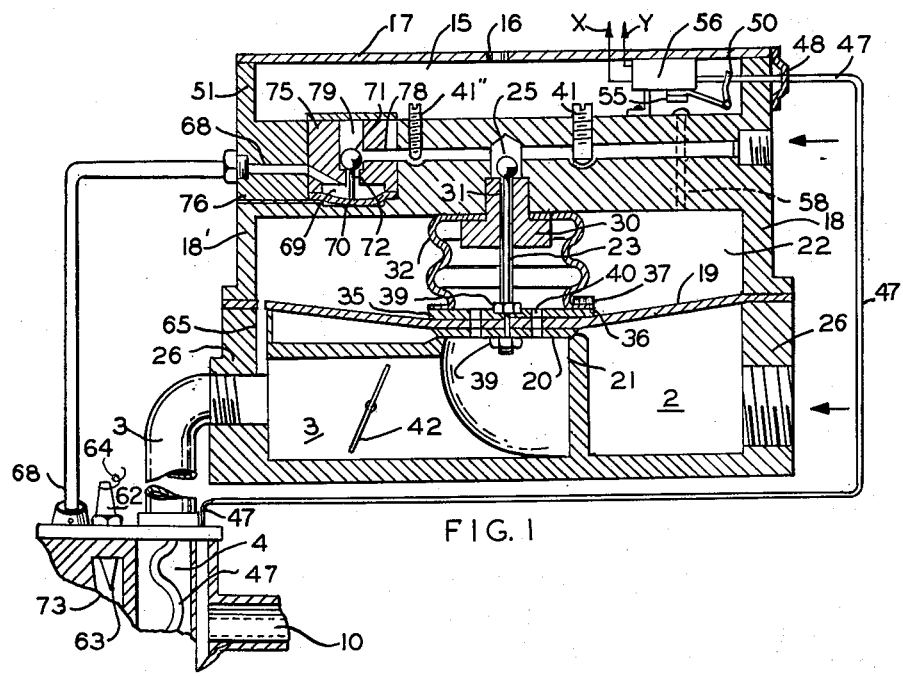
FIG. 1 is a vertical cross sectional view of a control device 11 shown in FIG. 12 which is made in accordance with the present invention. A partial vertical cross sectional view of a gas burner D, shown more in detail in FIGS. 3 and 4 is connected to the control device.

Referring more particularly to FIG. 1 the control device comprises a chambered casing having a main gas passage 1 connected to a source of combustion gas, such as a natural gas main (not shown), and an air chamber 2 connected to the atmosphere. Within the casing are provided air and gas passages and control means for effecting mixtures of air and gas which are conducted through a mixing chamber comprising the chambered passage 3 pipe 3 and connection 4 in the rear of the perforate partition or burner grid 5. On the front or opposite side of the burner grid 5 the combustible mixture is ignited when heat is demanded in the space to be heated. The flame maintained in front of the grid 5 extends somewhat into the enlarged combustion chamber 6 (FIG. 3) which is directly in front of the grid 5 and within the casing 6'. The combustion chamber is maintained at the predetermined sub-atmospheric atmospheric pressure during combustion, and from the description it will become apparent that the combustible gas supply will immediately cease when the pressure in the system approaches that of the atmosphere. This feature is an important characteristic of the system in that any failure in its operation will allow the pressure therein to seek that of the atmosphere and the flame will immediately be extinguished for lack of fuel.

The burner grid 5 faces the combustion chamber and is mounted in a somewhat semi-cylindrical shell 14 which encloses the chambered space 4 at the rear of the grid. The shell 14 projects into the end of the combustion chamber. It is mounted on the wall 6' of the combustion chamber and spaced from the end, side and bottom walls thereof so that a gas passage 14' will remain between the shell 14 and the walls of the combustion chamber. Conduit 10 FIG. 3 conducts inert gas into the combustion chamber in back of the burner shell, from whence the inert gas passes around the shell 14 through the annular passage 14' and around the bottom of the burner, for preventing the burner shell from becoming excessively heated and for regulating the temperature thereof. The inert gas passing through the somewhat semi-annular passage 14' forms a protective envelope of gas next to the inner wall 14 of the combustion chamber before the inert gas mixes with the products of combustion. In the first of a series of burners inert gas may be taken from the tail pipe of the vacuum pump 8 (FIG. 10) and conducted through conduit 12 to the conduit 10, or alternatively atmospheric air may be used instead of the stack gas. For regulating or discontinuing the in-put of inert gas to the first burner of a series of damper or shut-off valve 99 may be installed in the conduit 10 or 12 (FIG. 10). The maximum length of conduit 10 between burners is preferably where the walls reach a temperature of about 200 degrees Fahrenheit during the combustion period, as this is about the lowest temperature within the infra red zone. A shorter conduit 10 may be used where the lowest temperatures of the zone are not utilized and a longer conduit may also be used for special purposes. The conduit 10 leading from the last burner in a system may desirably be a conduction radiator located in the heated room, the area of which may be more or less according to the existing temperature conditions and those sought to be regulated. The cooling may be conveniently brought to a low level, say 150 degrees Fahrenheit which represents the utilization of a large amount of heat which is lost in the stacks of most conventional heating systems in which stack gases are about 300 to about 600 degrees F.

Figure 2:
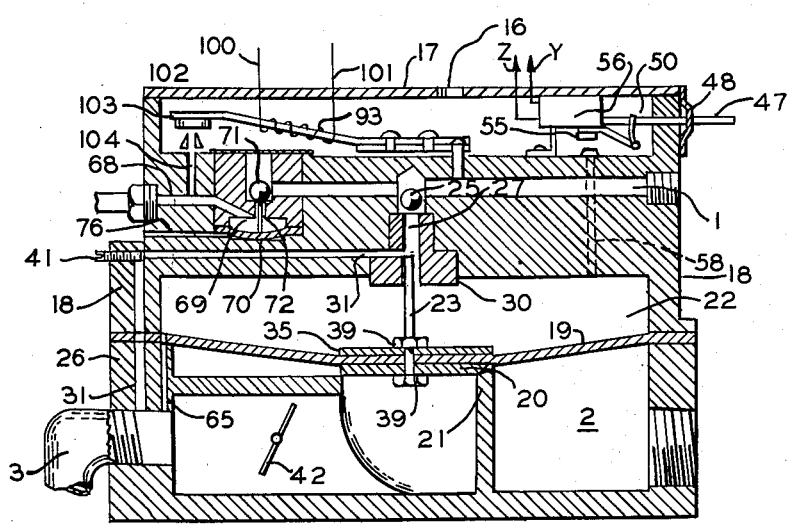
FIG. 2 is a similar cross sectional view of a modification of the device shown in FIG. 1.
Figure 6:
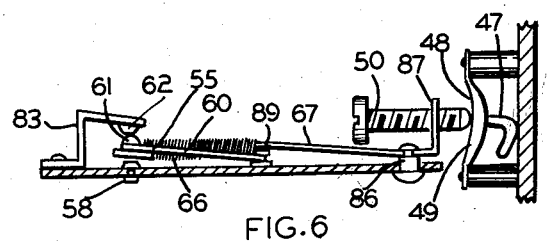
FIG. 6 is a side elevational view of the switch shown in FIG. 5.
Figure 11:
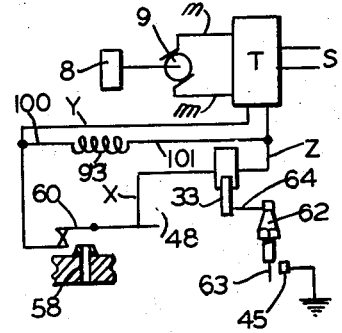
FIG. 11 is a diagrammatic representation illustrating electrical connections within the novel device.

Referring again to FIGS. 1 and 2 the parts shown therein are in the position when the space to be heated has been heated to the desired temperature, no combustion is taking place and the space thermostat T is not demanding heat. In this position the flap valve 55 and passage 58 are open to permit free passage of atmospheric air to the variable pressure chamber 22 from atmospheric port 16 and chamber 15; and from chamber 22 through passage 65 in FIG. 1 or 31 in FIG. 2 to the chamber or passage 3 which is in direct connection with the exhaust means. The micro switch contact points 61 and 62 are in closed position as shown in FIG. 6. The micro switch thrust pin 50 is withdrawn toward the right as shown in FIGS. 1, 2 and 6 which is the cold position permitted by the diaphragm 48 of the thermal unit when the same is in the cooled position. At this time the terminals at the space thermostat T (not shown) which operate to close the exhaust motor circuit $m$—$n$ (FIG. 11) and the terminals in the circuit $y$—$z$ are open, thus deenergizing the transformer 33 in the spark plug circuit and the heater coil 93 (FIG. 2) when the latter is used in some modifications of the device.

In this position the main gas passage between the main gas supply pipe 1 and the mixing chamber 3 is closed by the valve 25 (shown as a ball valve) which is in the position shown in FIGS. 1 and 2. The gas valve 25 is thus caused to close when atmospheric pressure prevails in variable pressure chamber 22 and at such time the weighted main air valve 20 carried by the pliant main diaphragm 19 closes the connection between the air supply pipe 2 and the mixing chamber 3. At this time the exhaust pump or means for reducing the pressure in the system, 8 is idle and the pressure in the mixing chamber 22, pilot gas pipe 68, combustion chamber 6 and the conduits 8, 10 and 12 are that of the surrounding atmosphere.

Referring to FIG. 1, the gas supply passage from main gas supply pipe 1 comprises the passage concentrically disposed about the main gas valve thrust rod 23 and within the inset 30, the chamber within the pliant extendable tube 32 and the passages 40 through the valve 20 and the disc 35. In FIG. 2 the pliant extendable tube 32 is eliminated and the gas is routed from the main gas valve 25 through chamber 27 underneath valve 25 and then through passage 31 to the mixing chamber 3 or to the space within pipe 3 which constitutes a part of the air-gas mixing chamber. The flow regulating valve 41 is suitably mounted in the casing, and is screwed in or out to restrict or increase the flow of gas.

When heat is called for by the space thermostat 43 in the thermostatic device T (FIGS. 11 and 12) the exhaust pump motor circuit $m$—$n$ is caused to be closed through the thermostatically controlled contacts of the thermostat 43, thereby actuating the motor which drives the exhaust pump 8. The exhaust pump is connected to the pipe 10 which leads to the combustion chamber 6. When the pressure in the combustion chamber and variable pressure chamber 22 is reduced to the predetermined sub-atmospheric pressure which is sufficient for the atmospheric pressure to raise the weighted valve 20 from its seat, air will be admitted to the mixing chamber 3. This however will not occur until after a pilot flame will have been established at the nozzle 45 and a thermal device has been heated by the pilot flame and caused to operate the micro switch to close atmospheric passage 58, thereby permitting the pressure to be reduced in the variable pressure chamber 22.

The thermostat in the space to be heated may be a well known conventional type in which the thermal element 43 is arranged to make and break the contact 44 which is in line $x$ and leads to the spark plug transformer 33, and the contact 46 in line $m$ which leads to the motor 9 that drives the exhaust pump 8. In this type of thermostat the bimetal element is arranged to close the contacts 44 and 46 as long as heat is demanded by the space or room thermostat, and to open the contact points when the heat requirement is satisfied.

Figure 3:
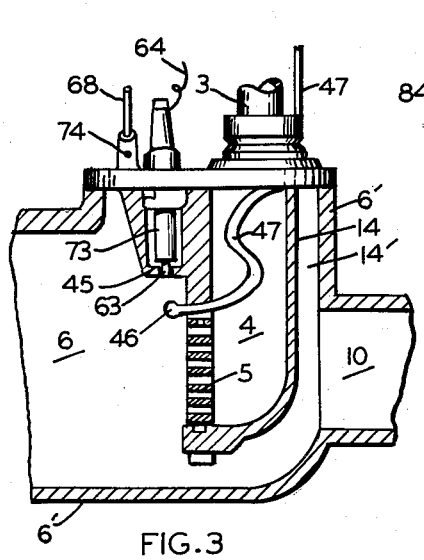
FIG. 3 is a partial view partly in cross section and partly in elevation of a gas burner like that shown in FIG. 1.

Pilot gas is admitted to the pilot nozzle past the diaphram actuated gas valve 71 at the end of the main gas passage 1. The variable pressure chamber 69 in the pilot gas supply passage is considerably smaller than the main variable pressure chamber 22 and the weighted diaphragm 70 is relatively light, so that a reduction of pressure in the combustion chamber 6 will be quickly communicated to pilot gas chamber 73, conduit 68 and pilot diaphragm variable pressure chamber 69. The reduction of pressure in the chamber 69 will permit pliant diaphragm 70 to be raised by the pressure of the atmospheric air admitted to the chamber beneath the diaphragm through air passage 76. The weighted valve thrust rod 72 on the diaphragm will raise the pilot gas valve 71 off its seat and gas will be drawn from chamber 79 at the end of gas main 1 around the thrust rod 72 and through chamber 70, connection 68, chamber 73 and nozzle 45. Air for mixing with the pilot flame gas will be drawn into the connection through the port 74 (FIG. 3). The pilot flame is directed across and in front of the burner grid 5, and it impinges directly on the bulb 46 of the thermal device. The spark plug transformer having been previously energized the combustible mixture of air and gas will be ignited by the sparks drawn between the terminal 63 of the spark plug and the nozzle wall 45 in the secondary circuit of the transformer.

The thermal device comprises the conduit 47 which terminates at one end in the thermal bulb 46 and at the other end in the expansion bulb having the diaphragm 48 (FIG. 6). The device is filled with mercury which expands when it is heated. When the mercury expands the diaphragm 48 of the expansion bulb moves outwardly against the thrust pin 50 which is mounted on the upstruck arm 87 of the T-shaped member 67 of the micro switch. The expansion of the mercury and operation of the thrust pin 50 along its axis takes place promptly after the pilot flame is established. The thermal element operates the micro switch in consequence of which the atmospheric passage 58 to the variable pressure chamber 22 is closed and the transformer circuit through the contact points 61 and 62 is opened, as will be more fully described hereinafter.

Figure 9:
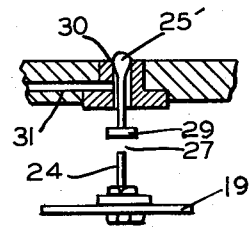
FIG. 9 is a partial front elevational view, partly in cross section of a modified air and gas valve operating means which is a modification of the somewhat similar means shown in FIG. 2.

Referring to FIG. 1, within the control device the space 15 is open to the atmosphere through the port 16 in the cover 17 which is mounted by any suitable means (not shown) on the upwardly projecting outer walls 51 of the casing. In wall 18 which is the lower wall of the space 15 is formed a gas supply duct 1 which is connected to the main gas supply, and beneath the wall 18 is formed the variable pressure chamber 22, the lower wall of which comprises a pliant imperforate diaphragm 19. A weighted atmospheric air valve 20 is seated on the valve seat 21 and is mounted integrally with and underneath the diaphragm. The diaphragm 19 may be mounted as a gasket between the upper and lower portions of the casing thereby forming the upper main variable pressure chamber 22 above the diaphragm and the atmospheric air chamber 2 below the diaphragm, the latter being in unobstructed connection with the atmosphere. The valve 20 is secured underneath the diaphragm by a threaded bolt or thrust rod 23 which extends upwardly so as to contact and lift the main gas ball valve 25 when the diaphragm 19 is caused to raise by reason of the reduction in pressure in the variable pressure chamber 22, as explained elsewhere. More or less delay in the opening of the main gas valve may be accomplished by lengthening or shortening the thrust rod 23 as illustrated in FIGS. 1, 2 and 9. The upper end of the thrust rod is caused to reciprocate in a guide formed in the insert 30. In FIG. 1 the guide bore is formed axially in the insert so that an ample passage will be provided for the combustion gas to pass downwardly and around the thrust rod, thereby forming an extension of the main gas inlet when the gas valve is opened by an upward thrust of the rod 23.

In the modification shown in FIG. 2 the thrust rod guide is formed in the lower part of the inset 30 and is narrowed to restrict the flow of gas around the upper part of the thrust rod, and a free and unrestricted passage 31 is formed in the insert 30 and wall 18' which passes through the seated portion of the diaphragm in the wall 18' and terminates in the gas mixing chamber 3 (or passage 3) which is connected to the space 4 in the rear of the burner grid 5. In the modification shown in FIG. 1 a pliant extendable tube 32 is sealed at the top and bottom ends underneath the insert 30 and at the lower end against the perforated disc 35 by means of a sealing washer 36 which is pressed over the flared lower end of the tube. The washer 35 serves both to weight the valve disc 20 and to operate as a sealing member for mounting the valve disc on the diaphragm 19. The lower threaded end of the thrust rod 23 is passed through the washer and the central part of the diaphragm 19 so that the valve disc 20 will properly seat on the valve seat 21, and the nuts 39 are adjusted to seal these three members together. The perforations 40 through the valve disc 20 operate as gas passages from the tube 32 to the mixing chamber 3 when the diaphragm is elevated to open the main gas valve. Gas flow check valves 41 and 41" are mounted in the casing to extend into the gas supply ducts for regulating the supply of gas.

An air supply regulating valve, such as the damper 42 is located in the passage comprising the mixing chamber for regulating the supply of air which is admitted through the relatively large air supply passage and mixed with the combustible gas which is admitted through relatively small passages as illustrated.

Figure 7:
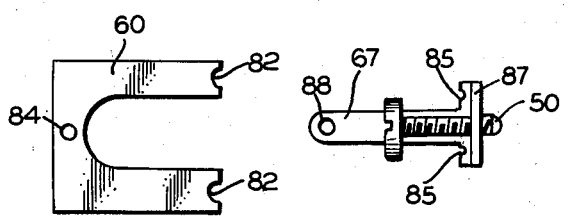
FIG. 7 is a plan view of certain details of the switch illustrated in FIGS. 5 and 6.
Figure 5:
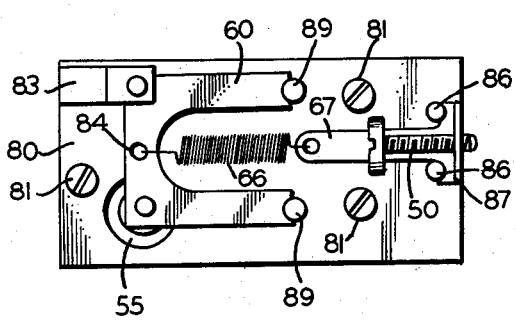
FIG. 5 is a plan view of a micro switch used in the device of the present invention.
Figure 8:
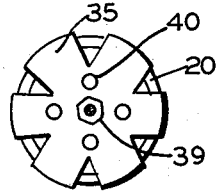
FIG. 8 is a plan view of the air valve shown in FIG. 1.
Figure 4:
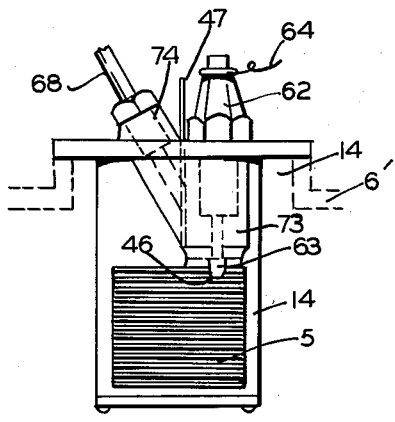
FIG. 4 is a front elevational view of the gas burner shown in FIG. 1.

A pilot flame nozzle 45 (FIG. 3) is mounted in the combustion chamber 6 which is arranged to direct a pilot flame across the front of the burner grid 5 for lighting the air-gas mixture which is supplied to the burner. This mixture is supplied to the burner in response to a call for heat by the thermostat T. The pilot flame which is instituted in response to the space thermostat is also directed to impinge on the bulb 46 at the terminus of the tube 47 of the thermal device. At the other end of the thermal device is an expansion bulb comprising the dished diaphragm 48 having a concave face 49 (FIGS. 5 and 6) facing the micro switch thrust rod 50. The expansion of bulb 49 causes the thrust rod 50 to be displaced axially when the mercury in the thermal device is heated and expanded. The expansion bulb 49 may be fixedly mounted on the exterior of the up-struck wall 51 where arrangement is made for the micro switch thrust rod 50 to project through an opening in the wall of the casing near the terminus of air passage 58, so that the pad 55 may be caused to open and close the passage 58 which leads from the atmosphere to the variable pressure chamber 22. The valve pad 55 is mounted on a specially constructed U-shaped arm of the micro switch (generally designated by the numeral 56) which is shown in detail in FIGS. 5, 6 and 7. The mercury tube 47 is arranged to connect the heated mercury bulb 46 and the expandible bulb 49, except that the tube 47 is brought through the space 4 at the rear of the burner and arranged therein as explained elsewhere.

When heat is not called for the terminals 61 and 62 on the micro switch arm 60 and 81 respectively are in contact and close the circuit through the primary of the transformer 33 so that a spark will be immediately instituted at the spark plug when the thermostat T calls for heat and closes the transformer circuit at the thermostat. When the spark plug is energized (FIG. 11) through the secondary circuit 64 of the transformer, sparking between the terminal 63 of the spark plug and the rim 45 of the pilot nozzle will ignite the pilot gas and cause the bulb 46 to be heated, as soon as a combustible air-gas mixture will have been supplied to the nozzle. Sufficient heating of the bulb 46 and expansion of the bulb 49 will operate through thrust rod 50 and the micro switch arms 67 and 60 to cause contacts 61 and 62 to open the primary circuit and discontinue the sparking, but the pilot flame will continue to operate until the gas supply thereto is cut off.

The Micro Switch

The micro switch (FIGS. 5, 6 and 7) is a self re-setting type in which the U-shaped arm 60 in the reset position, or normal position is elevated at its outer end so that the valve pad 55 will open the air duct 58 to the atmosphere and the electrical contacts 61 and 62 will be in contact with each other. The micro switch is mounted on the nonconductive base 80 which is mounted in turn within the space 15 (generally designated 56 in FIG. 1) in operative position by means of the set screws 81. The parts of the switch and its operating arrangement are insulated from the base 80. At one end is the stationary arm 83 bent at an angle so as to form a stop member for the switch arm and a mounting for the contact member 62 which is connected to the lead of circut x—y—z. The U-shaped switch arm 60 reciprocates making contact between contacts 61 and 62 in its upper position and closing the flap valve 55 over the end of passage 58 in its extreme downward position. The switch arm 60 pivots on the semi-circular pivot bearings 82 at the ends of the legs. The pivot bearings engage the under cut pivot pins 89 which are secured to the base 80. The switch arm is held in position against the pivot pins by the tensed spring 66 which is secured to the arm by hooking the spring in the centrally positioned opening 84 at the bottom of the U. The other end of the spring is similarly hooked in the opening 88 at the end of the arm 67 of the T-shaped thrust pin mounting. The end of the arm 67 is spaced from the middle point of the switch arm 60 so that the spring will cause the arms 60 and 67 to be held securely against their pivots and pins.

The T-shaped thrust pin mounting is also provided with semi-circular pivot bearings or cut-outs 85 on opposite sides of the cross member of the T which are equally spaced from the center line. These cut-outs are opposed to the cut-outs 82 of the U-shaped switch arm and are engaged by the under cut pivot pins 86 which serve as pivot points. The U-shaped switch arm 60 and the T-shaped thrust pin mounting are accordingly held in place against the opposed pivot pins by the tensed spring 66. The level of the pivot pins 86 is desirably adjusted so that these pivot points are slightly higher than the pivot points on the pins 89. This adjustment may be varied by placing shims on the pivot pins 86 underneath the cross arms 87, whereby more or less elevation may be obtained. By this adjustment of the level of the pivot points the rise or re-setting of the reciprocating end of the switch arm 60 is assured when the thrust pin 50 is allowed to move toward the diaphragm 48 upon cooling of the thermal device. The stationary member 83 which carries the contact member 62 is bent over at the end and serves as a stop member for limiting the throw of the outer end of the switch arm 60. This is adjusted so that the extreme throw of the switch arm 60 will be above the upper throw point of the near end of the T-shaped thrust pin mounting 67 where the tension member 66 is attached, and so that when the pivot point in the opening 85 is raised to its upper limit the pivot point at the other end of the tension member 66 will be higher than the pivot point in the opening 85. The stop member 83 is also adjusted so that the switch arm 60 will be spaced a short distance from both the contact 62 and from the nozzle of the air passage 58 when the switch arm 60 is in the middle of its throw. The pivot points on pins 89 and 86 are located in planes parallel to the base member 80, so that the lower throw of the free ends of both the switch arm and the T-shaped thrust pin mounting will be lower than the opposed pivot points on the pivots 85.

At the far end of the T-shaped thrust pin mounting and outside of the pivot points 86, an up-thrust abutment 87 is provided and the thrust pin 50 is threaded therethrough so that the axis of the pin is higher than and parallel to the member 67 and so that leverage will be provided to force the arm 67 down against the upward bias of the spring 66 and cause the assembly to pivot on the points 85 when axial thrust is applied to the end of the pin 50 by the diaphragm 48 in the direction of the switch arm 60. Thrust in this direction will occur rapidly when the thermal bulb 46 is being heated by the pilot flame and movement in the opposite direction will occur slowly as the thermal element is allowed to cool after the combustible gas mixture is discontinued and a heating period is ended.

The thrust pin has a somewhat rounded end which contacts with the diaphragm 48. As the diaphragm 48 moves toward and away from the switch arm, the contacting end of the pin 50 moves axially and also moves rectilineally up and down across the face of the diaphragm 48. The friction of the thrust pin on the diaphragm 48 operates to restrain the movement of the free end of the thrust pin mounting 67, especially during the cooling of the thermal element and the re-setting of the micro switch. This restraining action is especially effective and results in a definite pause in the upward movement of the switch arm 60 when it is in a position to be out of contact with both the electrical contacts and the contact of pad 55 with the nozzle of the passage 58. This pause occurs about the time that the thrust pin mounting 67 and the switch arm 60 are parallel to each other. At the point where these arms are parallel the rectilinear movement of the pin across the diaphragm 48 is arrested temporarily as the cooling of the thermal element continues and the contraction of the diaphragm 48 continues. The rectilinear movement will then resume only when a starting force has accumulated by the increasing non-parallelism of the arms 60 and 67, sufficient to overcome the starting resistance of the thrust pin on the diaparagm. When the necessary force has accumulated the switch arm will move with a snap like movement into its re-set position where the electrical circuit will be closed by the contact of the contact points 61 and 62. In case of a premature call for heat by the room thermostat 43 in the thermostatic device T which would start the exhaust pump 8, this pause in the re-setting of the micro switch provides a period of time for scavengering the combustion chamber of a combustible gas mixture before an igniting spark will have been established at the pilot nozzle by the closing of the contacts 61 and 62. This action will prevent a preliminary and unwanted puff or explosion which might be damaging.

Considerable variation in the desirable frictional reaction between the thrust pin 50 and the diaphragm 48 may be attained by varying the roughness of the contacting surfaces or by varying the materials of construction of these parts; and variations in the operation of the switch can be made by varying the throw of the switch arm 60. A satisfactory combination of materials of construction comprises a threaded thrust pin 50 composed of nonconducting material, such as the synthesis organic polymer, "nylon," rounded somewhat bluntly at the contact end, and a diaphragm 48 composed of rolled carbon steel, but other materials and combinations can be used which will produce similar effects.

The nonconductive mounting between the thrust pin 50 and the diaphragm 48 of the thermal element may be made by other means known to the art, such as by mounting the up-struck member 87 on the reciprocating T-shaped arm 67 so that the current will not be conducted from one to the other, or by insulating the resilient tension means 66 at either end. It will be apparent that the arrangement of parts is made so that a vertical component of force will be produced by the tension means 66 sufficient to raise the reciprocating end of the switch arm 60 to its extreme upward position shown in FIG. 6 when the thrust pin 50 is permitted to move to the right as shown. An opposite axial movement of the thrust pin will first bring the switch arm 60 and the thrust pin mounting member toward parallelism and reduce the vertical component. When the vertical thrust is at or near zero and the thrust pin is moved farther toward the left, the arm 67 will be moved downwardly and produce a downward component which will eventually move the parts into their extreme downward positions. The reverse or re-setting of the switch operating parts has been hereinabove described.

The Thermal Element

The thermal element (FIGS. 1, 3, 6 and 12) comprises a conduit 47 closed at one end by the thermal bulb 46 and at the other end by a somewhat pliant concave disc 48, preferably composed of thin metal parts. The device is filled with a material such as mercury which expands when heated so that upon heating the concave disc 48 will be thrust outwardly and tend to flatten. The thermal bulb is located in front of the burner grid 5 where the pilot flame will impinge upon it, and conduit is brought through the chamber 4 in the rear of grid 5 and arranged in the space in a tortuous or coiled form so as to constitute a radiator of effective length, for moderating the heating of the mercury and for providing a re-ignition of the pilot flame in case of a flame-out of the same before the establishment of the burner flame at the start of a heating cycle. The time required to heat the thermal element, causing the micro switch to operate and cause sufficient sub-atmospheric pressure in the chamber 22 to open the main air valve 20 and gas valve 25 is short but appreciable. A lag in the opening of the gas valve is also provided in some modifications of the control device. In case of a flame-out of the pilot flame after the thermal element is heated and before the heating flame become fully established at the burner 5, cool air-gas mixture will be drawn through the chamber 4 at the rear of the burner grid. The contacts 61 and 62 in the spark plug circuit will be open and no means will be present at this moment to re-establish the pilot flame. However accelerated cooling of the thermal element will be effected by the cool air-gas mixture passing through and around the thermal device radiator, so that the micro switch will promptly re-set, the spark plug circuit through the contacts 61 and 62 will be re-established and the pilot flame will accordingly be re-established.

Auxiliary Control

In FIG. 2 is illustrated a means for aiding the purge of combustible gas from the combustion chamber immediately before flame propagation and for delaying momentarily the supply of combustible gas mixture to the pilot flame nozzle after the kindling spark is established. A heater 93 is sunt connected across the leads z—y (FIG. 11) so that the coil will be heated as long as the thermostat T calls for heat. The heater is arranged to heat a bi-metal element on the normally open spring arm 102 so that the arm will be depressed when heated, and return to normal open position when cooled. The spring arm carries the valve pad 103 which closes the passage 104 when the bi-metal element is heated and the arm is depressed from its normal position which is illustrated in the drawings. Accordingly the air passage to the pilot flame nozzle will be held open a short time after the exhaust fan is put in operation at the beginning of a heating cycle and immediately before the flame is started. Air will be drawn through passage 104, passage 68 and the pilot flame nozzle 45 during the time needed to heat the bi-metal element and repress the arm 102, thereby aiding in purging the combustion chamber immediately before flame is established at the burner grid 5.

When the room thermostat 43 in the thermostatic device T ceases to call for heat the circuit z—x—y is opened and current will be discontinued through the heater coil 93, allowing the bi-metal element to cool and the arm 102 to raise to normal position. It will be discerned that the heater coil will remain closed as long as the room thermostat 43 in the thermostatic device T calls for heat, so that the supply of gas to the pilot nozzle will not be discontinued after it is once established. The duration of the purging may be varied by varying the character of the heating element, or by other arrangements whereby the effective heating will be accelerated or decelerated.

The Burner

It has been found that various types of burner grids cause an audible vibration or sound when the burner is in operation in the above described system, such as the grid 5 shown in FIG. 3. Grid 5 is composed of flat narrow bars of metal which are spaced apart to form narrow slits through which the combustible air-gas mixture issues. The cause of this phenomenon is not known. This defect in operation has been remedied by the use of a novel grid which may be made by taking a double coiled wire and crushing it into a flat ribbon while forcing it endwise so that the coils will lay over each other. Then the ribbon is cut into lengths. The lengths are placed side by side with the ends even and fastened together along their sides to form a flat rectangular grid. The strips or lengths may be fastened together by lacing with a fine wire, or by any suitable means, such as by welding or soldering along the edges. The series of openings along the length of each strip have curved margins. The openings 113 along the middle of the strips are the largest, and the margins are convexo-convex in shape, each opening being separated by a strand of wire. At the ends of the convexo-convex openings are somewhat triangular shaped openings 115 having two concave sides and a convex side. Above and below each point of the convexo-convex openings are somewhat rectangular openings 114 having two concave sides and two convex sides. These openings are arranged in a regular pattern. The largest openings 113 are the convexo-convex openings. Next in size are the four sided openings 114 and the smallest are the three sided openings 115. Burner grids made in the manner described are perfectly quiet in operation. Wire of about 18 gauge made into a double coil about one half inch in diameter is satisfactory as the coil from which to fabricate the grid.

Modified Gas Valve

Modified main gas valve connections and a modified main gas passage around the variable pressure chamber are shown in FIGS. 2 and 9, and a modified pilot valve is shown in FIG. 9. Referring to FIG. 2 the main gas valve is moved to open position by the weighted thrust rod 23 which is shortened to provide a spacing at the upper end. The spacing permits the main air valve 20 to be lifted off its seat a short distance to permit air to pass to the mixing chamber in advance of the admission of gas to the chamber. The thrust rod is fitted into the lower part of the in-set 30 so that it will slide up and down freely. In the modification shown in FIG. 9 the weighted thrust rod 23 is attached to the gas valve instead of the air valve, and a weight 29 is attached to the lower end of the rod 23 and spaced from the ceiling of the variable pressure a short distance 27 which will allow the gas valve to be fully opened. The thrust rod 24 is mounted on the weighted diaphram in line with the axis of the thrust rod 23. Spacing 27 below the weight 29 permits the air valve to be opened before the thrust rod engages the weight 29 and raises the poppet gas valve 25'. When the poppet valve is thrust upwardly to open position the gas passes into the chamber 27 and through the passage 31 around the variable pressure chamber 22, and into the connection 3 where it mixes with the air. The flow of gas through the passage 31 may be regulated by the regulating valve 41 which operates to enlarge or restrict the passage. More or less delay in the opening of the gas valve 25' by varying the gap 27. The admission of air for a short time in advance of the admission of gas provides a scavengering action in the mixing chamber which operates to prevent premature ignition and explosions.

*The Operation*

Referring to FIG. 1, when heat is called for by the space thermostat T, the primary electrical circuit x—z—y which is connected to the source of current through the thermostatic device, is closed through connections (not shown) to energize the spark plug transformer 33, and the motor circuit m—n which drives the vacuum pump is also closed. Resultantly a circuit is closed (FIG. 11) through micro switch arm 60, stationary 81, contacts 61 and 62, to the primary of the transformer and the other side of the power supply line. The secondary of the transformer 33 is connected to the spark plug electrode 63 through the line 64 and to the ground across the gap at the pilot flame nozzle 45.

The vacuum pump circuit being closed, the vacuum pump 8 will reduce the pressure in the system to the predetermined desired pressure in chamber 6, chambers 3 and 4, pilot gas duct 68, pilot flame variable pressure chamber 69. The reduction of pressure in the latter chamber causes the atmospheric pressure to the chamber beneath the diaphragm 70 to raise the diaphragm, the weighted thrust rod 72 and the pilot gas valve 71. Combustion gas is then drawn from the gas supply passage 1 to the pilot nozzle chamber 73 and pilot nozzle 45 through duct 68. Atmospheric air for forming a combustible mixture is drawn into the duct 68 through the small port 74. At the pilot nozzle the previously energized spark pulg ignites the pilot flame which is directed on the bulb 46 of the thermal device and along the face of the burner grid 5. The first function of the pilot flame is to heat the bulb 46, expand the mercury in the thermal device, force the diaphragm 48 outwardly against the thrust pin 50 and operate the micro switch. Spacing is provided in the micro switch so that the reciprocating end of the switch arm 60 may be moved down into an intermediate position where the primary circuit through the contact points 61 and 62 will be opened before the expansion of the mercury and movement of thrust pin 50 will have been sufficient to close the valve pad 55 over the nozzle of the passage 58. At the beginning of a heating period the heating of the mercury is rapid and the switch arm is moved promptly into its extreme downward position to close the passage 58 almost as soon as the circuit is broken. The pilot flame will continue to operate as long as the reduction of pressure is maintained in the combustion chamber.

As soon as the atmospheric passage 58 is closed the reduction of pressure will begin to build up in the variable pressure chamber 22. When the differential between the atmospheric pressure in chamber 2 and the reduced pressure in chamber 22 is sufficient to overcome the weight of the weighted valve 20 and valve thrust rod 23, the diaphragm 19 will be forced upwardly to open air valve 20 and the main gas valve 25. The opening of the valves will be simultaneous in the modification shown in FIG. 1. In the modifications shown in FIGS. 2 and 9 there will be a short delay in the opening of the gas valve while the thrust rod actuated by the diaphragm closes the gap 27. In FIG. 1 upon the opening of the gas valve 25, combustion gas will be drawn from the main gas supply pipe 1 through passage 31, pliant tube 32, and passages 40 into the mixing chamber where it will mix with air admitted under valve 20. The mixture will pass through the pipe 3, chamber 4 and burner grid 5 where it will be ignited by the pilot flame. The flow of gas may be regulated by suitable manipulation of the screw threaded plugs 41 and 41' which project into the main gas passage 1.

The flame thus produced in front of the grid 5 is drawn into the combustion chamber 6 and the walls 6 of the chamber are promptly heated to a temperature which will cause the walls to emit infra red, say about 600 degrees to 800 degrees Fahrenheit.

When the predetermined room temperature is reached at the thermostat T, the thermostat is arranged to open the circuit to the exhaust pump motor 9, then pressures approaching that of the surrounding atmosphere will promptly build up in the system. The low pressure in the variable pressure chamber 22 will be relieved through the passage 65 which communicates with the pipe 3. When the pressure is sufficiently increased the weighted main air valve will close and withdraw the thrust rod 31, permitting the main gas valve 25 to close, thereby discontinuing the supply of combustible gas mixture to the burner.

The pressure in the pilot flame variable pressure chamber 69 will build up through the nozzle 45, pilot nozzle chamber 73 and passage 68, allowing the diaphragm 70 to fall and close the pilot gas valve 71, whereby the pilot flame will be extinguished. This permits the cooling of the bulb 46 and the contraction of the mercury in the thermal device. The parts in and about the burner casing will have become very hot during the combustion period and the cooling of the mercury will take place slowly in the thermal device, with a consequent slow contraction of the bulb 49 and withdrawal of the micro switch thrust pin 50. The operation of the micro switch during the cool off period has been heretofore described in connection with the description of the micro switch.

The operation of the control valves illustrated in FIGS. 2 and 9 is similar to that described above, except that the lowering of the thrust rod 23 with the diaphragm 19 will permit the closing of the gas valve slightly in advance of the main air valve. In FIG. 2 the shunt circuit 100—101 through the heater coil 93 will be opened at the thermostat when the circuit z—x—y is opened. This will permit the cooling of the heater coil 93 and return of the spring arm 102 to its upward position, thereby removing the pad 103 from the terminal of the air passage 104.

In preliminary adjusting and adapting the system for operation the operator will have regard to the capacity of the vacuum pump which must be ample to establish the desired sub-atmospheric pressure and to maintain the same during combustion. The promptness with which the pilot flame chamber 69 is exhausted and the diaphragm 70 operates the pilot gas valve is regarded so that the pilot flame will be established in advance of the bleeding of the variable pressure chamber 22 and operation of diaphragm 19 to open the main air and gas valves. The relative volumes of air and gas to make a suitable combustion mixture and the rate of supply of combustion mixture to provide the requisite total heat for each burner are matters of adjustment, the execution of which will be apparent from an understanding of the foregoing description.

A desirable sub-atmospheric pressure to maintain in the combustion chamber during combustion is about 1 inch of water to about 2½ inches of water below that of the surrounding atmosphere, but more or less can be used. Less than ½ inch is not highly effective and more than 4 inches is highly sensitive. The tail pipe of the heating system, or the part of the pipe 10 extending to the exhaust means 8, from the end of the last infra red zone may vary in form and length, and comprise a heat exchanger of any desirable design, such as a finned pipe, for transferring residual heat from the exhaust gas to the space to be heated, or elsewhere. The temperature of the gas may be reduced to temperatures such as 150 degrees Fahrenheit, or even less. The exhaust gas contains a considerable amount of moisture. When the temperature of the gas is reduced below the dew point the condensated moisture may be removed by installing a condensate trap at a suitable low point in the exchanger conduit. The passages 65 or 31 which communicates with the variable pressure chamber 22 of FIGS. 1 and 2 may desirably be relatively small as compared to conduit 10 and the passage 3 in order that means, such as the damper 42 for proportioning the air to the combustion gas may be highly effective. In the modification of the control valve shown in FIG. 2 additional gas flow regulators, such as the regulators 41 and 41″ of FIG. 1 may be installed in the gas supply passage 1, if desired.

From the foregoing disclosure it will be recognized that the invention is susceptible of various modifications without departing from the scope and spirit thereof, and it is to be understood that the invention is not restricted to the specific illustrations herein set forth, except as they are specifically limited by the terms of the appended claims.

This is a continuation-in-part of my application Serial No. 771,779, filed November 4, 1958, now abandoned, which is a continuation-in-part of application Serial No. 531,144, filed August 29, 1955, now abandoned.

I claim:

1. A control device of the kind described which comprises a walled casing having a combustion-gas inlet conduit, a mixing chamber, an atmospheric air chamber connected to the mixing chamber through a normally closed valve-controlled port, a main variable pressure chamber, an open conduit providing a communication between said variable pressure chamber and said mixing chamber, a normally open valve-controlled air passage leading from said variable pressure chamber to the atmosphere and a normally closed combustion-gas inlet conduit leading to the mixing chamber; a pliant diaphragm mounted in the casing and separating said atmospheric air chamber from said variable pressure chamber, said diaphragm being responsive to differences in fluid pressure between that of the atmosphere and that within the variable pressure chamber; an air valve responsive to movements of said pliant diaphragm, said valve being normally disposed to close the port between said air and mixing chambers; a combustion-gas valve disposed to close said normally closed combustion-gas inlet conduit; a valve-operating rod responsive to movements of said pliant diaphragm for operating said combustion-gas valve; a normally open valve for closing said open passage from the atmosphere to the variable pressure chamber; means for operating said open valve which includes a thermal device having a movable member responsive to changes of temperature therewithin; a thermostatic device which is responsive to a predetermined low temperature; an electrical control-circuit having contacts which are responsive to said thermostatic device; means for heating said thermal device, said means being responsive to said thermostatic device; and means responsive to said movable member of the thermal device for actuating said open valve to closed position, thereby to reduce the pressure in the variable pressure chamber and thereby to actuate said main diaphragm for admitting air and combustion-gas to the mixing chamber when the pressure in the mixing chamber is reduced.

2. A device in accordance with claim 1 in which the means for heating the thermal device comprises a flame device having a nozzle; said casing having enclosed therein a pilot-gas variable pressure chamber, a chamber open to the atmosphere, a normally closed valve-controlled pilot-gas passage and a pilot-gas conduit leading to said flame nozzle; a pilot gas valve for closing said pilot-gas passage; said control device comprising a chambered burner casing having a combustion chamber; another burner device mounted in said casing and directed into said chamber; a pliant diaphragm separating said pilot gas variable pressure chamber from said chamber which is open to the atmosphere; said flame device being positioned to direct a flame across said other burner device; said last named pliant diaphragm being responsive to a predetermined reduction of pressure in the combustion chamber for opening said pilot-gas valve; said means for heating said thermal device comprising means for igniting said flame.

3. A device in accordance with claim 1 which has a pilot gas variable pressure chamber and a normally open valve-controlled passage leading from the atmosphere to said pilot-gas variable pressure chamber; a valve for closing said last named normally open valve-controlled passage; means activated by an electrical control-circuit for closing said atmospheric port; said last named means comprising a heat responsive element.

4. A device in accordance with claim 3 in which the means activated by said electrical control-circuit for closing said atmospheric port comprises a heat responsive element.

5. A device in accordance with claim 1 in which the means for heating the thermal device comprises a flame device, and said electrical control-circuit comprises a flame ignition circuit and a normally closed circuit-closing means therein; a displaceable self re-setting arm responsive to said movable member of said thermal device, said arm being operably associated with said circuit closing means; associated with said displaceable self re-setting arm for de-activating said flame igniter when said arm is displaced.

6. A device in accordance with claim 5 in which the means associated with said displaceable self re-setting arm for de-activating said flame igniter when said arm is displaced comprises means for discontinuing the flame ignition circuit during the heating cycle.

7. A device in accordance with claim 1 in which the means responsive to said movable member of said thermal device for actuating said open valve to closed position comprises a self re-setting arm; and the means for heating the thermal device comprises a flame device associated with an electrical circuit which includes a normally closed circuit interrupting means and a flame ignition means; said self re-setting arm comprising means for opening said closed circuit interrupting means and inactivating the flame ignition means when said thermal device is heated to a predetermined temperature.

8. A device in accordance with claim 1 in which the normally closed valve-controlled combustion gas passage leading from the combustion gas inlet conduit to the mixing chamber comprises a pliant tube which traverses the variable pressure chamber and is secured to said air valve, said air valve being weighted and having an air passage which connects the space within the pliant tube with the mixing chamber.

9. A device in accordance with claim 1 in which the normally closed valve-controlled gas passage leading to the mixing chamber comprises a passage which communicates directly with the same.

10. A device in accordance with claim 1 which comprises a burner housing having a combustion chamber; a pilot flame nozzle; a normally closed pilot gas valve; a conduit for conducting combustible gas from the combustion gas inlet to the pilot flame nozzle; a space thermostatic device having a thermostat disposed in the space to be heated; a thermostat circuit including said thermostat and normally open terminals therein; means for admitting air for purging the combustion chamber of combustible gas immediately before a flame is instituted therein, which includes a normally open valve-controlled branch passage leading to the atmosphere from said pilot gas passage, a valve for closing said branch passage, means for activating said valve to effect said closing a predetermined interval of time subsequent to the establishment of a predetermined reduction of pressure in the pilot variable pressure chamber below that of the atmosphere and for maintaining the valve in said closed position as long as said space thermostat circuit is closed, and means responsive to said atmospheric pressure for opening said normally closed pilot gas valve after said branch passage is closed.

11. A device in accordance with claim 1 in which the means responsive to a predetermined low temperature comprises means for initiating and maintaining a predetermined constant sub-atmospheric pressure in the combustion chamber which includes a damper positioned near the weighted air valve for proportioning the air intake to the mixing chamber.

12. A device in accordance with claim 1 in which the valve operating thrust rod which is responsive to movements of the diaphragm for operating the main combustion gas valve to open position, is spaced from said gas valve for permitting the diaphragm to move and open the weighted air valve a predetermined amount before opening said gas valve.

13. A device in accordance with claim 1 in which the means for actuating the normally open valve which is operable to close the passage from the variable pressure chamber to the atmosphere includes a thermal device having a communicating tube filled with heat responsive material, said tube being disposed to traverse a passage through which a combustible gas mixture is admitted to the burner.

14. A control device in accordance with claim 1 in which the thermal device has a target at one end exposed to said means for heating said thermal device and an expandible element responsive to the heating of the target; a self-re-setting arm; means engaged by said expandible element for displacing said arm; and a valve closing means on said self re-setting arm for closing said passage when said arm is displaced.

15. A heating system having a walled combustion chamber and a conduit leading therefrom which comprises therein an area to be heated to temperatures which emit infra red rays, a burner for burning a combustible fuel mixture which is disposed to direct a flame into the combustion chamber; a mixing chamber disposed to deliver said combustion fuel mixture to said burner; a variable pressure chamber; said combustion chamber, conduit, burner, variable pressure chamber and mixing chamber being located within the space to be heated by the system; a thermostatic control device; exhaust means responsive to said thermostatic control device for exhausting combustion gases from the system and creating a predetermined sub-atmospheric and constant pressure in the conduit, combustion chamber and mixing chamber when a predetermined low temperature is reached in the space to be heated; means for permitting atmospheric pressure to be re-established in said chambers and conduit when a predetermined high temperature is reached in said space; pilot flame means for igniting a combustible fluid fuel supplied to said burner; said pilot flame means having a normally closed valve-controlled pilot-fuel passage for supplying a combustible fluid fuel to the pilot flame when a predetermined sub-atmospheric pressure is established in said combustion chamber; a burner assembly comprising a burner; a variable pressure chamber having a wall comprising a pliant diaphragm; a normally closed valve-controlled passage for supplying a combustible fuel mixture to said burner when a predetermined sub-atmospheric pressure is established in said variable pressure chamber; means displaced by said diaphragm for opening said valve-controlled passage; said pilot flame means and said burner assembly having means operable to maintain a flow of fuel to said burner as long as said sub-atmospheric pressure is maintained in said variable pressure chamber; and means operative for discontinuing the supply of combustible fuel when atmospheric pressure is established in said variable pressure chamber.

16. A heating system in accordance with claim 15 having means for increasing the area to be heated in infra red which comprises a plurality of combustion chambers and a connection for conducting to one combustion chamber the exhaust gases from another of the said combustion chambers.

17. A heating system in accordance with claim 15 having means for increasing the area to be heated in infra red which comprises a connection for conducting to a combustion chamber combustion gases discharged by said exhaust means.

18. A heating system in accordance with claim 16 in which the combustion chambers are connected in series; means for increasing and moderating the area of infra red radiation which includes a housing disposed over the combustion chamber and conduit, said housing being open at the bottom and formed at the top to trap heated air along the walls of said heated area, and being disposed in close proximity to said area for preventing the passage of air currents transversely across the heated area.

19. A heating system in accordance with claim 16 in which the combustion chambers are connected in series; with each other; and means for increasing and moderating the area of infra red radiation which includes a housing disposed over the combustion chamber and conduit, said housing being open at the bottom and formed at the top to trap heated air along the walls of said heated area, and being disposed in close proximity to said area for preventing the passage of air currents transversely across the heated area, said housing being provided with an inner surface which is reflective for reflecting infra red rays downwardly.

20. The method of heating which comprises locating the walls of a combustion chamber and a conduit connected thereto within a space to be heated; connecting said combustion chamber to a fuel mixing chamber; reducing the pressure within said chamber and conduit to a predetermined pressure below that of the surrounding atmosphere in response to a thermostatic call for heat in said space, and maintaining said reduced pressure during a subsequent burning of a fluid combustion mixture of fuel within said chambers; supplying said fluid combustible mixture to said combustion chamber in response to said thermostatic call for heat; maintaining said reduced pressure in said chambers and conduit while heating the walls of said combustion chamber and conduit to infra red by the burning of said fuel; increasing the area so heated to infra red and moderating the intensity of such heating in the combustion chamber and conduit; and thereafter establishing the pressure of the surrounding atmosphere in said chambers and conduit, thereby to discontinue said heating and the supply of fuel for combustion.

21. A control device of the kind described which comprises a walled casing having a combustion-gas inlet conduit, a mixing chamber, an atmospheric air chamber connected to the mixing chamber through a normally closed valve-controlled port, a main variable pressure chamber, and open conduit providing a communication between said variable pressure chamber and said mixing chamber, a normally open valve-controlled air passage leading from said variable pressure chamber to the atmosphere and a normally closed combustion gas inlet conduit leading to the mixing chamber; a pliant diaphragm mounted in the casing and separating said atmospheric air chamber from said variable pressure chamber, said diaphragm being responsive to differences in fluid pressure between that of the atmosphere and that within the variable pressure chamber; an air valve responsive to movements of said pliant diaphragm, said valve being normally disposed to close the port between said air and mixing chambers; a combustion-gas valve disposed to close said normally closed combustion-gas inlet conduit; valve operating means responsive to movements of said pliant diaphragm for operating said combustion gas valve; a normally open valve for closing said open passage from the atmosphere to the variable pressure chamber; means for operating said open valve which includes a thermal device having a movable member responsive to changes of temperature therewithin; a thermostatic device which is responsive to a predetermined low temperature; an electrical control circuit having contacts which are responsive to said thermostatic device; means for heating said thermal device, said means being responsive to said thermostatic device; and means responsive to said movable member of the thermal device for actuating said open valve to closed position, thereby to reduce the pressure in the variable pressure chamber and thereby to actuate said main diaphragm for admitting air and combustion-gas to the mixing chamber when the pressure in the mixing chamber is reduced.

22. A heating system having a walled combustion chamber, a mixing chamber and a conduit communicating with said chambers, said conduit leading directly from said combustion chamber and comprising therein an area to be heated to temperatures which emit infra red rays; a burner for burning a combustible fuel mixture which is disposed to direct a flame into the combustion chamber and a fuel mixing chamber disposed to deliver said combustion mixture to said burner, said combustion chamber, conduit and burner being located within the space to be heated; a normally closed main fuel valve disposed to supply fuel to said mixing chamber; a normally closed main air valve disposed to supply air to said mixing chamber; means for opening said main fuel and main air valves; a thermostatic control device; exhaust means responsive to said thermostatic device for creating a predetermined sub-atmospheric and constant pressure in the conduit, combustion chamber and mixing chamber when a predetermined low temperature is reached in the space to be heated; pilot flame means comprising a normally closed valve-controlled pilot fuel passage, a pilot burner nozzle and means for admitting fuel to said valve-controlled passage and to the nozzle, said last means including means for delaying the supply of said fuel to the pilot flame until after the exhaust means is activated; and means for opening the main air supply valve and the main fuel valve after the pilot flame is established, said last named means including means for thereafter opening both the main air valve and the main gas valve.

23. A heating system in accordance with claim 22 in which the means for opening the main air supply valve and the main gas valve includes means responsive to the pilot flame for activating said means.

24. A heating system in accordance with claim 22 which comprises means for admitting heated non-combustible gas to the combustion chamber for increasing the area of infra red radiation.

25. A heating system in accordance with claim 22 having means for increasing the area of infra red radiation which includes a housing disposed over the combustion chamber and conduit, said housing being open at the bottom and formed at the top to trap heated air along the walls of said heated area, and being disposed in close proximity to said area for preventing air currents from passing transversely across the heated area.

26. A heating system in accordance with claim 22 which comprises means therein for preventing re-ignition of a combustible fuel mixture within the combustion chamber immediately after a failure to initially establish a burner flame, which comprises means for temporarily preventing actuation of the pilot flame ignition means.

References Cited in the file of this patent
UNITED STATES PATENTS

| | | |
|---|---|---|
| 529,719 | Eils | Nov. 24, 1894 |
| 663,351 | Mauser | Dec. 4, 1900 |
| 1,712,881 | Gibson | May 14, 1929 |
| 1,782,683 | Giacomino | Nov. 25, 1930 |
| 2,039,910 | Kriechbaum | May 5, 1936 |
| 2,439,038 | Cartter | Apr. 6, 1948 |
| 2,538,222 | Wilson | Jan. 16, 1951 |
| 2,642,128 | Riehl | June 16, 1953 |
| 2,671,838 | Senn | Mar. 9, 1954 |
| 2,759,472 | Cartter | Aug. 21, 1956 |
| 2,833,895 | Weber et al. | May 6, 1958 |
| 2,896,852 | Bittorf | July 28, 1959 |

FOREIGN PATENTS

| | | |
|---|---|---|
| 108,204 | Great Britain | July 31, 1917 |